Sept. 8, 1942.                M. E. THOMPSON                2,295,019
                             ELECTRODYNAMIC BRAKE
                             Filed Oct. 31, 1939
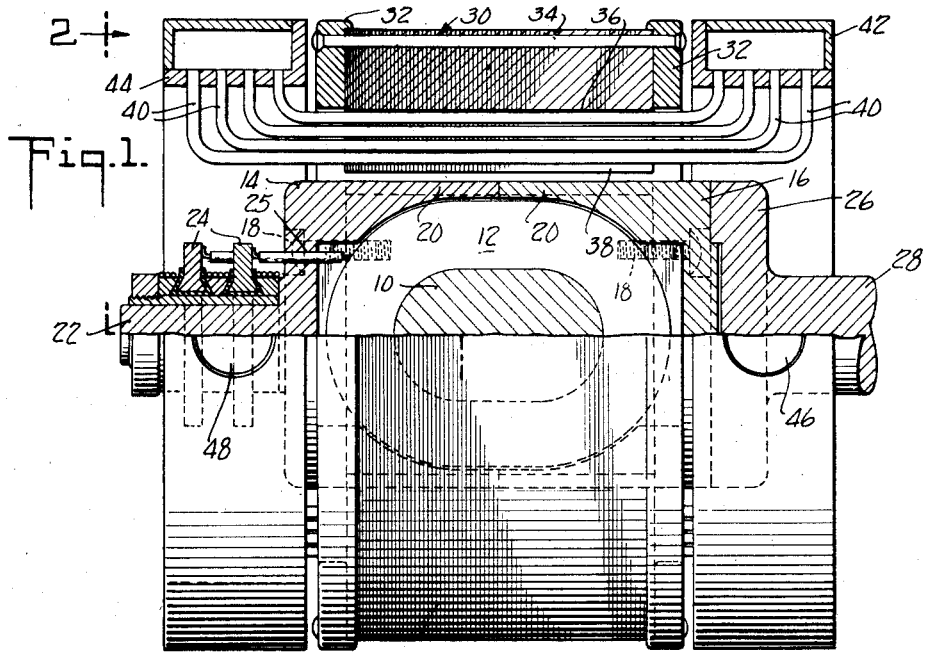
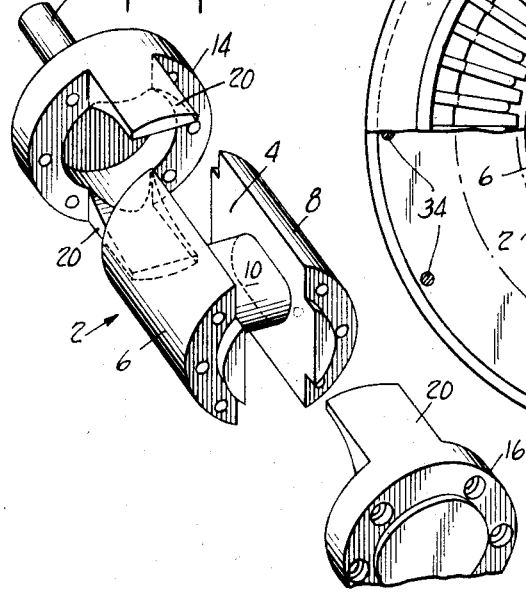
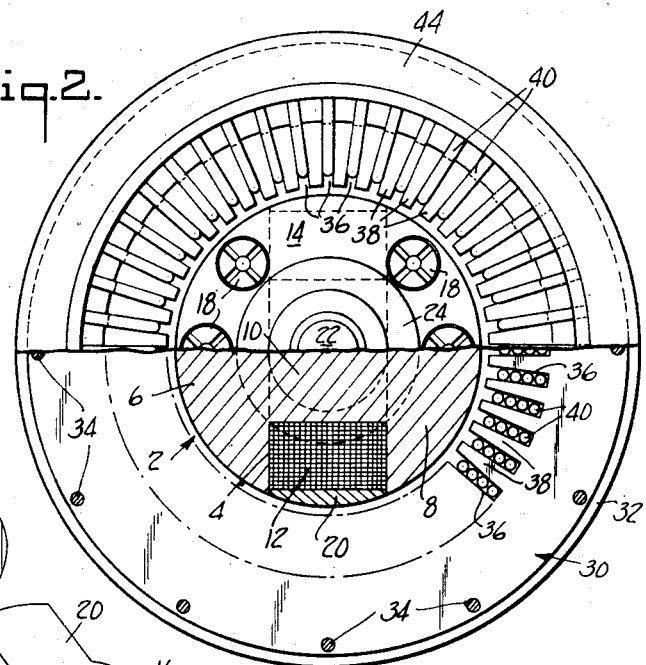
INVENTOR.
MILTON E. THOMPSON
BY Bartlett, Eyre, Scott + Keel
ATTORNEYS Patented Sept. 8, 1942

2,295,019

UNITED STATES PATENT OFFICE 2,295,019

ELECTRODYNAMIC BRAKE

Milton E. Thompson, Ridgway, Pa.

Application October 31, 1939, Serial No. 302,089

5 Claims. (Cl. 188—104)

The present invention is concerned with apparatus for absorbing and dissipating kinetic energy or motive power and comprises an electro-dynamic device particularly adapted for use as a frictionless brake for vehicles of all types, including automobiles, railways, elevators and marine vessels.

The great increase in speed of vehicles in recent years has forced the friction type of brake to the limits of its capacity and created a demand for a more satisfactory type of brake. In the past attempts have been made to develop frictionless brakes in which the power is transformed into electrical energy and then converted into heat by passing the generated current through a resistance. Such attempts have met with but partial success because the dissipation of the heat from the rheostat was almost as difficult a problem as the dissipation of the heat from a friction brake. Moreover this type of braking, which used the driving electric motor as a generator was only applicable to electrical propulsion. The brake of the present invention, unlike frictionless brakes theretofore suggested, is a commercially practicable and simplified device in which all of the steps of the electro-dynamic braking cycle are executed within a single apparatus. In effect, the new brake is a special type of electro-dynamic generator in which the rotating element which receives the kinetic energy to be absorbed is the field element and the stationary element is the armature. It may be used for braking of rotary motion, irrespective of the type of motive power.

For an understanding of the invention reference may be had to the accompanying drawing illustrating the preferred embodiment of the invention.

Fig. 1 is a side view of the improved frictionless brake, with the upper half cut on a radial plane through the axis to show sections across both rotor and stator;

Fig. 2 is part axial end view and part sectional view of the brake taken along the line 2—2 of Fig. 1; and Fig. 3 is an exploded perspective view of the rotor illustrating the construction thereof.

The rotating field structure which is of the bipolar type with single field coil will first be described. A steel cylinder 2 (see Fig. 3) is provided with a longitudinally wide and deep slot 4 which divides the cylinder into the two poles 6 and 8 connected by the central core 10. The single field winding 12 is wound about the core 10 in the slot 4. The cylindrical member 2 with the field coil 12 forming the magnetic structure of the rotor is supported and driven by two non-magnetic end plates 14 and 16 of bronze or other non-magnetic material. Each end plate is bolted to an end of the cylinder 2 by six cap bolts 18, three into each pole piece. These bolts have deep cylindrical heads slotted for a cross-shaped screw driver and the plates are counter-bored the full depth of the bolt head so that the bolt heads do not project above the surface of the plate. Each plate 14 and 16 is provided with a pair of projecting horns 20 which fit into the slot 4 and which together with the pole pieces and end plates completely enclose the field winding 12. These horns 20 take practically all of the driving torque. Plate 14 is provided with a short projecting shaft 22 upon which are mounted collecting rings 24. The ends of winding 12 are connected to the rings 24 through an aperture 25 in the plate 14. The rotor is not provided with bearings of its own but is overhung from a flange 26 on the main driving shaft 28; suitable bolts (not shown) being provided to hold the flange 26 and plate 16 together.

The stationary armature or stator of the brake comprises a magnetic core 30 which is made up of steel laminations clamped between steel plates 32 by rivets 34. The inner periphery of the core 30 is provided with deep slots 36 forming teeth 38 therebetween. Four hollow conducting tubes 40 of high resistance non-corrosive metal pass through each slot 36 and form a squirrel cage winding of the stator. The ends of each tube 40 are bent out radially at right angles and are welded to annular water boxes 42 and 44. Connections for the inlet and outlet of water to the boxes are indicated at 46 and 48 respectively.

In the embodiment of the invention illustrated the brake is shown mounted directly on the power line shaft 28. If the speed of this shaft is quite low, the brake rotor may be connected to the power shaft by speeding up gears to thus reduce the size and weight of the brake and to increase its capacity.

In operation water or other cooling fluid is supplied to the inlet 46 and withdrawn from the outlet 48. Control of the brake is effected by varying the current in the field winding 12 by means of a rheostat (not shown) in the usual manner for the control of generator fields. No other control for the brake is required. When no current is supplied to the winding 12, no braking effect is obtained. When current is supplied to the winding, the rotation of the magnetically energized rotor will generate a voltage in the stator conductors and since these conductors are all connected in closed circuits, current will immediately flow through them in proportion to the generated voltage. Since the flow of the electrical current is entirely confined to the squirrel cage winding of the stator, it will be wholly transformed into heat in the resistance of the stator winding itself. Thus the amount of power or kinetic energy which is dynamically converted into electrical energy is immediately transformed into heat in the same conductors in which it is first generated as electrical energy. Since the squirrel cage winding consists of hollow tubes through which water or other cooling fluid, such as air, is circulating, this heat is directly transferred to the cooling fluid and carried away and dissipated thereby.

It should be noted that the hollow conductors 40 forming the squirrel cage winding are not insulated from the stator core 30 and that no combustible material or material which can be damaged by abnormally high temperatures are used in the construction of the stator. By laminating the armature core, eddy currents are eliminated and the generated currents are substantially confined to the hollow conductors. By placing the squirrel cage winding in the slots of the armature core, the air gap between rotor and stator is kept small and the torque is kept at a maximum.

It should be noted also that as friction is not employed in the cycle of operation of this brake there will be no wear of any part due to frictional abrasion, which is the most serious defect of any kind of friction type of brake, causing frequent and expensive renewals of the frictional parts of such brakes.

The durability and dependability of this electro dynamic brake will be, therefore, immeasurably superior to any type of friction brake.

The invention has now been described in connection with the preferred embodiment thereof. The invention has been described as embodied in a frictionless brake for vehicles for which purpose it will have prime utility. Obviously, however, various other fields of use are possible. It could, for example, be used as an absorption dynamometer for absorbing and measuring the power output of all kinds of motors, including electric motors, steam engines and internal combustion engines. Various other uses will be apparent to those skilled in the art.

The following is claimed:

1. An electro-dynamic brake comprising in combination a direct current excited field structure of substantially cylindrical form, an outer stationary armature comprising a cylindrical core having radial teeth extending inwardly toward and close to said field structure and tubular conductors of high resistance extending longitudinally between said teeth to form a squirrel cage winding of the armature, and means for circulating cooling fluid through said conductors.

2. An electro-dynamic brake according to claim 1 wherein said field structure comprises a steel cylinder having a longitudinal slot therein dividing the cylinder into two poles connected by a core, a field coil within said slot and surrounding the core, and a pair of end plates secured to the ends of said cylinder, said end plates having projections adapted to fit into said slot and over said coil, said projections, end pieces and pole sections completely enclosing said field coil.

3. In an electro-dynamic brake, the combination with an internal revolving field structure excited by a direct current winding, of an external stationary armature structure having a steel core provided with slots the open ends of which extend toward the field structure, and a high resistance tubular squirrel cage winding positioned in the slots of said core, and means for circulating a cooling medium through said armature winding.

4. In an electro-dynamic brake, the combination with a revolving field structure excited by a direct current winding, of a stationary armature structure having a steel core provided with slots the open ends of which extend toward the field structure, and a high resistance tubular squirrel cage winding positioned in the slots of said core, and means for circulating a cooling medium through said armature winding.

5. In an electro-dynamic brake, the combination with a field structure excited by a direct current winding, of an armature structure having a steel core provided with slots the open ends of which extend toward the field structure, and a high resistance tubular squirrel cage winding positioned in the slots of said core, and means for circulating a cooling medium through said armature winding.

MILTON E. THOMPSON.